(12) United States Patent
Kajino et al.

(10) Patent No.: US 7,764,364 B2
(45) Date of Patent: Jul. 27, 2010

(54) LENS METER FOR MEASURING OPTICAL CHARACTERISTICS OF A LENS

(75) Inventors: Tadashi Kajino, Okazaki (JP); Yutaka Ohmori, Gamagori (JP)

(73) Assignee: Nidek Co., Ltd., Gamagori-Shi (JP)

( * ) Notice: Subject to any disclaimer, the term of this patent is extended or adjusted under 35 U.S.C. 154(b) by 647 days.

(21) Appl. No.: 11/658,181

(22) PCT Filed: Aug. 23, 2005

(86) PCT No.: PCT/JP2005/015262
§ 371 (c)(1),
(2), (4) Date: Jan. 23, 2007

(87) PCT Pub. No.: WO2006/022253
PCT Pub. Date: Mar. 2, 2006

(65) Prior Publication Data
US 2008/0291433 A1  Nov. 27, 2008

(30) Foreign Application Priority Data
Aug. 23, 2004 (JP) .............................. 2004-242946

(51) Int. Cl.
*G01B 9/00* (2006.01)
(52) U.S. Cl. .................. 356/124; 356/125; 351/228
(58) Field of Classification Search .......... 356/124–127
See application file for complete search history.

(56) References Cited

U.S. PATENT DOCUMENTS

| | | | |
|---|---|---|---|
| 3,880,525 A | 4/1975 | Johnson | |
| 5,682,234 A | 10/1997 | Kajino | |
| 5,910,836 A | 6/1999 | Ikezawa et al. | |
| 6,972,837 B2 | 12/2005 | Kajino | |
| 2003/0043367 A1 * | 3/2003 | Kajino | 356/124 |

FOREIGN PATENT DOCUMENTS

| | | |
|---|---|---|
| JP | S 50-145249 | 11/1975 |
| JP | A 61-251733 | 11/1986 |
| JP | U 1-135344 | 9/1989 |
| JP | A 9-43099 | 2/1997 |

(Continued)

*Primary Examiner*—Tarifur Chowdhury
*Assistant Examiner*—Tara S Pajoohi
(74) *Attorney, Agent, or Firm*—Oliff & Berridge PLC

(57) ABSTRACT

A lens meter having a measurement-optical system including a light source which projects and a light-receiving sensor which receives a light beam having passed through the lens; an arithmetic part which obtains optical characteristics of the lens from results received by the light-receiving sensor; mode selecting device which selects between a single-focal-lens-measurement mode and a progressive-lens-measurement mode; detecting device which detects directions and degrees of displacement of measurement positions from a near-vision portion of a progressive lens based on optical characteristics obtained when the progressive-lens-measurement mode is selected and alignment is made to bring the measurement position into the near-vision portion; a display which displays an alignment screen; and a display-control part which causes the display, based on detection results by the detection device, to display a guide mark indicating a direction and an amount that the lens must be moved to bring the measurement position into the near-vision portion.

9 Claims, 6 Drawing Sheets

FOREIGN PATENT DOCUMENTS

| | | |
|---|---|---|
| JP | A 9-43101 | 2/1997 |
| JP | Y2 2569718 | 1/1998 |
| JP | A 10-104119 | 4/1998 |
| JP | A 2000-266639 | 9/2000 |
| JP | A 2003-75296 | 3/2003 |

* cited by examiner

LENS METER FOR MEASURING OPTICAL CHARACTERISTICS OF A LENS

TECHNICAL FIELD

The present invention relates to a lens meter for measuring optical characteristics of a lens.

BACKGROUND ART

There is a lens meter arranged to project a measurement light beam to a target lens to be measured, which is placed on a measurement optical axis, receive the measurement light beam having passed through the target lens by a light receiving sensor, and obtain optical characteristics of the target lens such as refractive power based on a received result by the sensor. In such lens meter, an alignment screen to be utilized for alignment of a desired position or region of the target lens relative to the measurement optical axis is displayed on a display. When a progressive lens is to be measured, for example, a progressive lens mark (a graphic image) simulating a progressive lens is fixedly displayed within the screen. Further, a target mark representing the measurement position or region is movably displayed within the screen in association with movement of the target lens relative to the measurement optical axis.

DISCLOSURE OF INVENTION

Problems to be Solved by the Invention

However, even if the above screen is displayed, it would be uneasy for an inexperienced and unaccustomed examiner to make accurate alignment for measurement of the progressive lens. In particular, it would be difficult to make accurate alignment of a near vision portion of the progressive lens.

The present invention has an object to provide a lens meter which readily enables accurate alignment of a progressive lens to be measured.

Means for Solving the Problems

A lens meter according to the present invention a lens meter for measuring optical characteristics of a target lens to be measured, comprising: a measurement optical system including a light source which projects a measurement light beam to the target lens and a light receiving sensor which receives the measurement light beam having passed through the target lens; an arithmetic part which obtains the optical characteristics of the target lens based on a received result by the light receiving sensor; mode selecting means which selects between a single focal lens measurement mode and a progressive lens measurement mode; detecting means which detects a direction and a degree of displacement of a current measurement position from a near vision portion of a progressive lens which is the target lens based on the optical characteristics obtained at a plurality of positions when the progressive lens measurement mode is selected and alignment is made to bring the measurement position into the near vision portion; a display which displays an alignment screen; and a display control part which causes the display, based on a detection result by the detection means, to display a guide mark indicating a direction in which and an amount by which the lens must be moved to bring the measurement position into the near vision portion.

In the lens meter according to the present invention, the measurement optical system is an optical system capable of measuring the optical characteristics at once at the plurality of measurement positions in a measurement region of the target lens, and the detection means detects the degree of displacement of the current measurement position from the near vision portion based on a gradient of additional power or spherical equivalent power in the optical characteristics obtained at the plurality of measurement positions.

In the lens meter according to the present invention, further, the display control part causes a progressive lens mark simulating the progressive lens and a target mark representing the measurement position to be displayed while displaying the guide mark in a region corresponding to the near vision portion of the progressive lens mark, and the display control part controls a correlation in display position between the target mark and the guide mark based on the detection result by the detection means.

In the lens meter according to the present invention, further, the detection means detects a direction and a degree of displacement of the current measurement position from a far vision portion of the progressive lens which is the target lens based on the optical characteristics obtained at the plurality of positions when the progressive lens measurement mode is selected and alignment is made to bring the measurement position into the far vision portion, and the display control part causes the display, based on the detection result by the detection means, to display the guide mark indicating a direction in which and an amount by which the lens must be moved to bring the measurement position into the far vision portion.

EXPLANATION OF REFERENCE CODES

Figure 1:
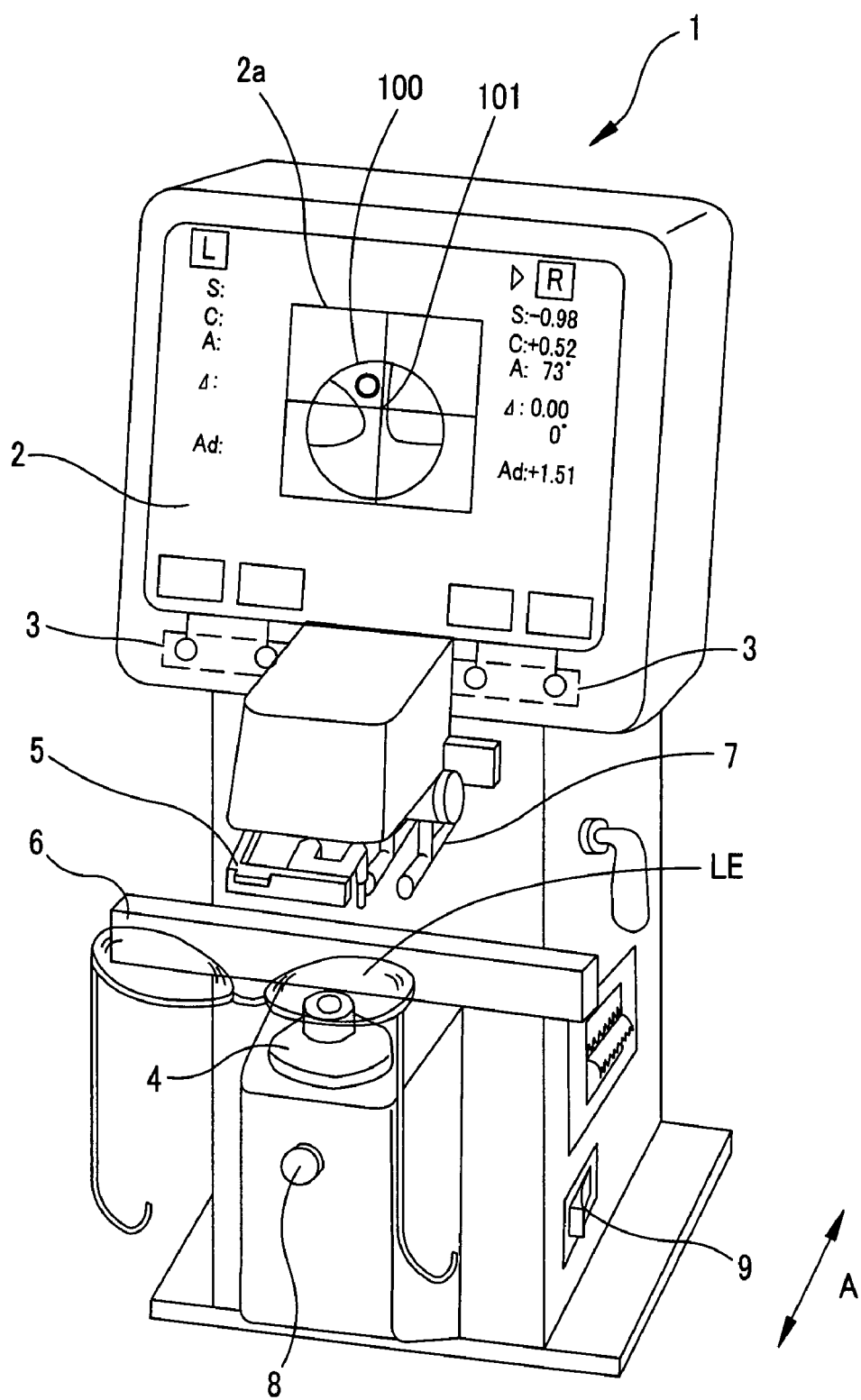
FIG. 1 is a schematic external view of a lens meter in a preferred embodiment of the present invention.

2 Display
10 Measurement optical system
14 Target plate
15 Two-dimensional light receiving sensor
40 Arithmetic control part
100 Progressive lens mark
101 Cross target mark
110 Guide mark for far vision portion
111a to 111d Arrow guide mark
120 Guide mark for near vision portion

BEST MODE FOR CARRYING OUT THE INVENTION

A preferred embodiment of the present invention will be explained with reference to the accompanying drawings. FIG. 1 is a schematic external view of a lens meter in the embodiment of the present invention.

On a display 2 such as a liquid crystal display provided in an upper part of a main body 1 of the lens meter, information necessary for measurement, measurement results, and others are displayed. Further, at a press of a switch 3 corresponding to a switch display appearing on the display 2, a necessary command such as measurement mode switching and the like is input.

A target lens LE to be measured is mounted on a nosepiece (a lens table) 4. A lens retainer 5 is moved down (toward the nosepiece 4) to stably hold the lens LE on the nosepiece 4.

When the lens LE set in a spectacle frame is to be measured, a frame rest (a lens rest) 6 movable backward and forward (in a direction indicated by an arrow A) is brought into contact with lower edges (lower edges in a spectacle wearing state) of right and left lens frames (or right and left lenses) for stable support. Consequently, a cylindrical axis angle of the lens LE can be measured accurately.

A marking mechanism 7 is used for applying a mark onto the lens LE. A READ switch 8 is a switch for transmitting a command signal for storing measurement results (optical characteristics data) of the lens LE. Upon pressure of the switch 8, the measurement results are displayed on the display 2 and simultaneously stored in a memory 42 of the main body 1. A power switch 9 is a switch for turning on the power of the apparatus.

Figure 2:
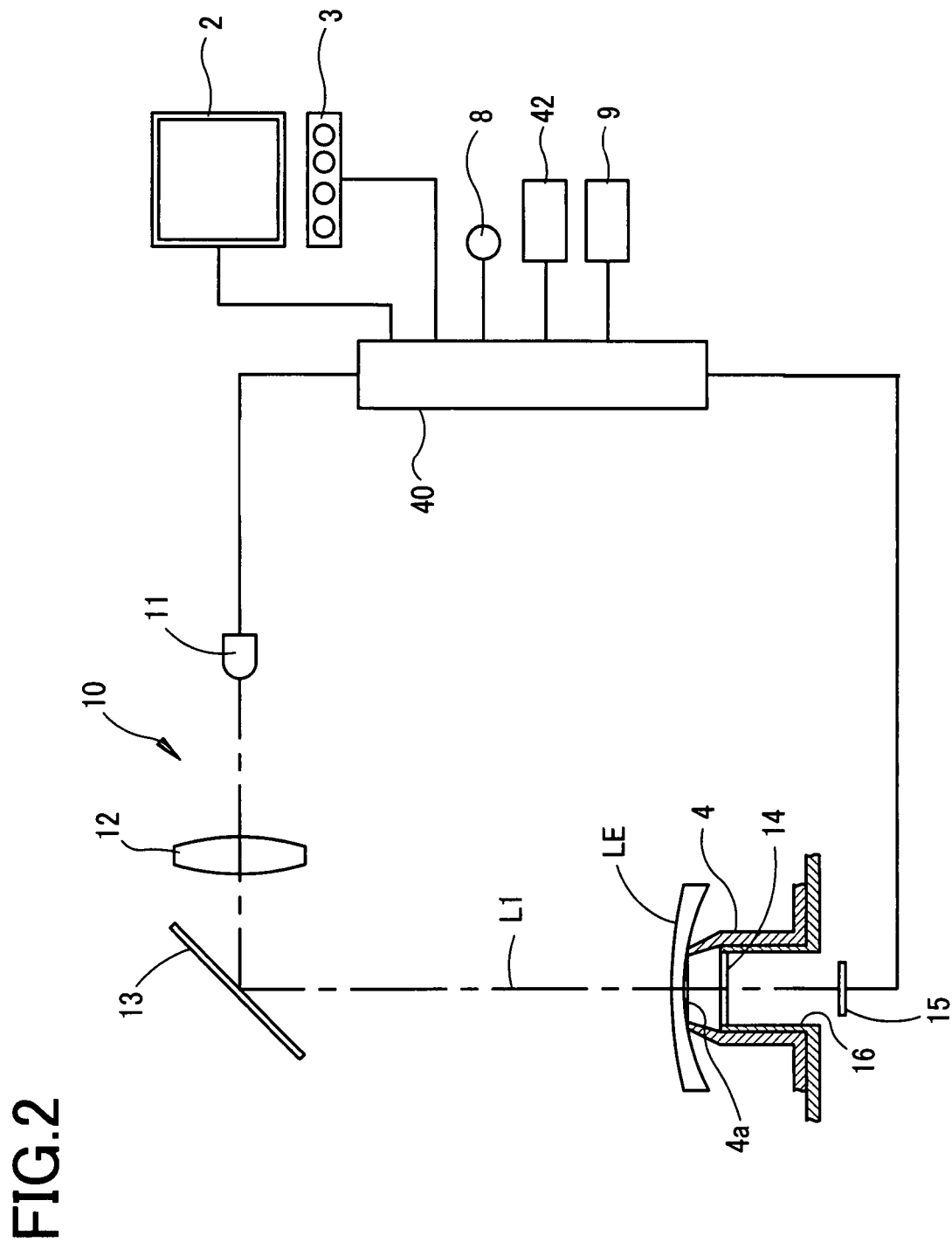
FIG. 2 is a schematic structural view of an optical system and a control system of the lens meter.

FIG. 2 is a schematic structural view of an optical system and a control system of the present apparatus (lens meter). Numeral 10 denotes a measurement optical system and L1 is its measurement optical axis. The measurement optical system 10 includes a light source 11 for measurement such as an LED, a collimating lens 12, a mirror 13, a target plate 14 formed with measurement targets, and a two-dimensional light receiving sensor (an image sensor) 15. The optical axis L1 passes through the center of an opening 4a of the nosepiece 4 and is perpendicular to an opening plane of the opening 4a. The target plate 14 is retained in a holding member 16 of the main body 1 and located just under and close to the opening 4a. The opening 4a is of a circular shape of about 8 mm in diameter.

Figure 3:
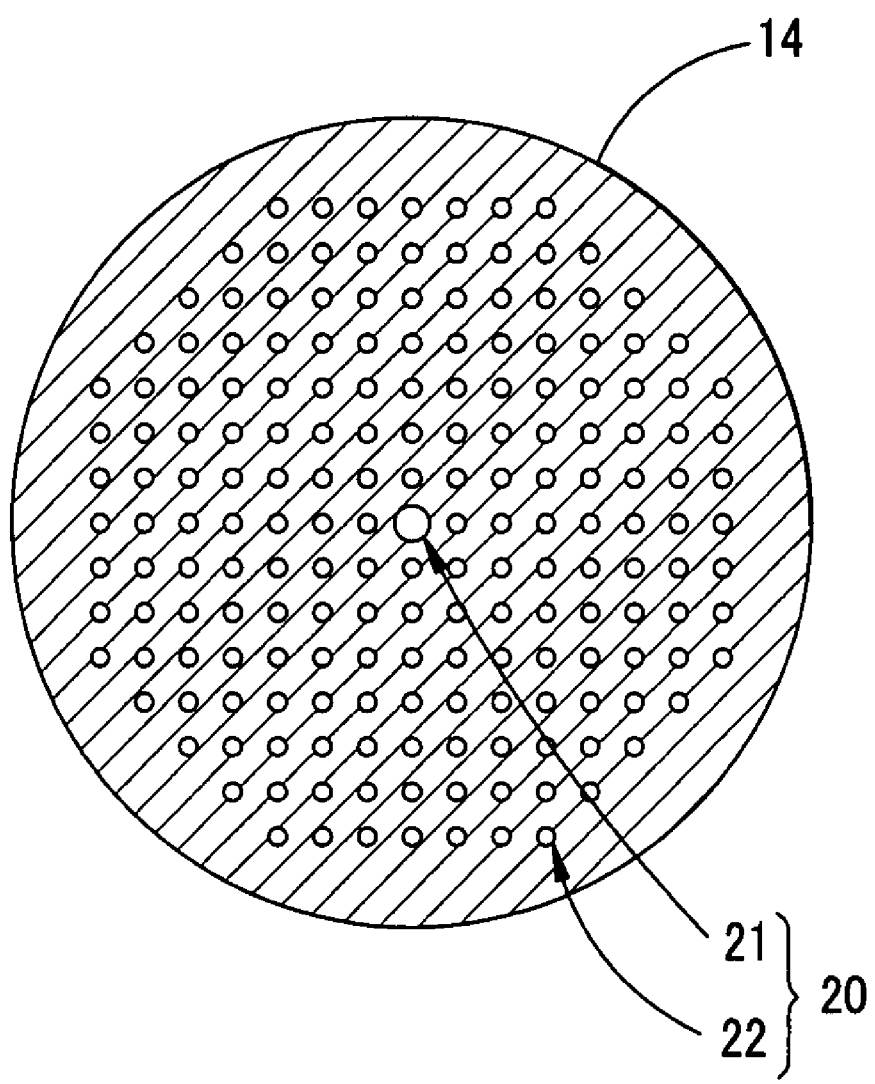
FIG. 3 is a diagram showing an arrangement (distribution) pattern of targets formed on a target plate.

FIG. 3 is a diagram showing an arrangement (distribution) pattern of targets formed on the target plate 14. The target plate 14 is of a circular shape having an outer diameter slightly larger than an inner diameter of the opening 4a and is formed with a number of targets 20. The targets 20 in the present embodiment include a center target 21 located at the center through which the optical axis L1 passes, the center target 21 being a large circular hole of about 0.4 mm in diameter, and peripheral targets 22 located around the center target 21 in a grid pattern with about 0.5-mm pitches, each peripheral target 22 being a small circular hole of about 0.2 mm in diameter. The number of targets 22 is 200, which are arranged within an area of about 7 mm in diameter centered about the optical axis L1. It is to be noted that the targets 20 may be formed by providing black Cr coating with voids as the target 21 and the targets 22 on a back surface of the target plate 14.

An image of the target 21 is used as an image of a reference target for specifying a correlation between images of the targets 22, that is, used as an image of a reference target for specifying the images of the targets 22 in a measurement state where the lens LE is placed on the optical axis L1 with respect to the images of the targets 22 with a "0 D (diopter) reference" in a reference state where the lens LE is not placed on the optical axis L1. The reference target is not limited in number and shape if only it can be distinguished from other targets, e.g., it may be located in any position other than the center position of the target plate 14.

A measurement light beam from the light source 11 is brought into a collimated light beam by the collimating lens 12, reflected by the mirror 13, and projected onto the lens LE mounted on the nosepiece 4 to be placed on the optical axis L1. Of the measurement light beams having passed through the lens LE, a measurement light beam having passed through the opening 4a, i.e., the target (hole) 21 and the targets (holes) 22 of the target plate 14, enters the light receiving sensor 15.

An output signal from the light receiving sensor 15 is input to an arithmetic control part 40 which is connected to the memory 42. The arithmetic control part 40 obtains optical characteristics of the lens LE (spherical power, cylindrical power, a cylindrical axis angle, prism power) from a change in the position (coordinate) of each target image detected by the light receiving sensor 15 in the measurement state where the lens LE having refractive power is mounted on the nosepiece 4 to be placed on the optical axis L1, with respect to the position (coordinate) of each target image detected by the light receiving sensor 15 in the reference state where the lens LE is not mounted on the nosepiece 4 and not placed on the optical axis L1. For example, in a state where the lens LE having only the spherical power is placed on the optical axis L1, the position of each target image will be scale up or down in a perfect-circular shape from the optical center of the lens LE as compared with a state where the lens LE is not placed on the optical axis L1. Based on this scaling amount, the spherical power can be obtained. In a state where the lens LE having only the cylindrical power is placed on the optical axis L1, the position of each target image will be scale up or down in an elliptic shape from the axial center of the lens LE as compared with a state where the lens LE is not placed on the optical axis L1. Based on this scaling amount, the cylindrical power and the cylindrical axis angle can be acquired. The prism power can be obtained based on the amount of translation of the position of the image of the target 21 or the image of each target 22 arranged around the target 21. The lens LE having the spherical power, the cylindrical power, and the prism power may be regarded as the complex of the above lenses (see U.S. Pat. No. 3,880,525 (JP-A-50 (1975)-145249)).

The arithmetic control part 40 can obtain the optical characteristics of the lens LE from an average of changes in respective positions of the target images in each group while regarding four adjacent target images ("2×2" spots) (at least three) as one group, or "3×3" spots, "4×4" spots, "5×5" spots, or the like as one group. The measurement position (the measurement point) at that time is determined to be the position of the lens LE corresponding to the center position of each target image group or a specific target image position. According to the configuration of the present apparatus (lens meter), it is therefore possible to simultaneously obtain the optical characteristics at a plurality of measurement positions (measurement positions) within a measurement region of the lens LE corresponding to the opening 4a. In other words, a distribution of the optical characteristics within the measurement region can be obtained. Accordingly, as to a progressive lens, it is possible to efficiently determine whether or not at least one of current measurement positions is in a far vision portion (whether or not part of the far vision portion is in the current measurement region). Similarly, it is possible to efficiently determine whether or not at least one of current measurement positions is in a near vision portion (whether or not part of the near vision portion is in the current measurement region) and whether or not at least one of current measurement positions is in a progressive portion (whether or not part of the progressive portion is in the current measurement region).

The arithmetic control part 40 controls a display on the display 2 based on a detection result of an alignment state of a desired position or region of the lens LE relative to the optical axis L1. The arithmetic control part 40 serially obtains the optical characteristics distribution in the measurement region at predetermined time intervals based on an output signal from the light receiving sensor 15.

The lens meter having the above configuration will be explained with a focus on alignment operations for the progressive lens. With the switch 3, a single focal lens measurement mode or a progressive lens measurement mode is selected, and which the lens LE is, a left eye lens or a right eye lens, is designated. The following explanation is made on a case where the progressive lens measurement mode is selected and the right eye lens is designated.

The optical characteristics shall be determined from changes in the positions of the target images in a group of "5×5" spots. The measurement position is regarded as the position of the lens LE corresponding to the center position of each target image group.

Figure 4A:
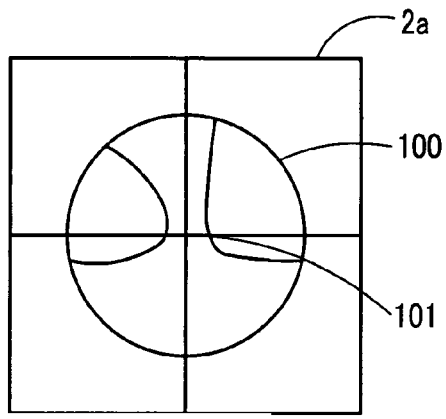
FIG. 4A is a diagram showing a display screen for alignment to bring a measurement region (measurement position) into a far vision portion of a lens LE.

When the progressive lens measurement mode is selected with the switch 3, as shown in FIG. 4A, a progressive lens mark 100 simulating a progressive lens and a cross target mark 101 whose intersection represents the center position of a current measurement region, namely, the measurement position corresponding to the optical axis L1 are displayed on an alignment screen 2a of the display 2. The near vision portion of the progressive lens is located inward (on a nose side) by about 2 mm than the far vision portion. When the right eye lens is designated, accordingly, a portion of the mark 100 extending from the progressive portion to the near vision portion is displayed at a slight slant to the left. The mark 100 in the present embodiment is movably displayed in association with changes in the alignment state of the lens LE in association of movement thereof on the nosepiece 4, while the mark 101 is fixedly displayed in the center of the screen 2a. In the present apparatus, an upper part of the screen 2a corresponds to a back side of the apparatus and a lower part of the screen 2a corresponds to a front side of the apparatus.

When the lens LE is put on the nosepiece 4, the arithmetic control part 40 determines part of the lens LE on which the measurement region (the measurement position) is, based on the optical characteristics distribution in the measurement region. Specifically, when spherical equivalent power or spherical power (additional power) differs (varies) between the measurement positions in the vertical direction of the lens LE, it is determined that the measurement region is in a nearly central part (a nearly central part of the progressive portion) of the lens LE. When the spherical (the additional power) and cylindrical power does not differ (vary) between the measurement positions in the vertical and lateral directions of the lens LE and horizontal prism power in each measurement position is approximately zero, it is determined that the measurement region is substantially in the far vision portion. When the cylindrical power differs (varies) between the measurement positions in the lateral direction of the lens LE, it is determined that the measurement region is substantially on the right and left sides of the progressive portion.

Figure 4B:
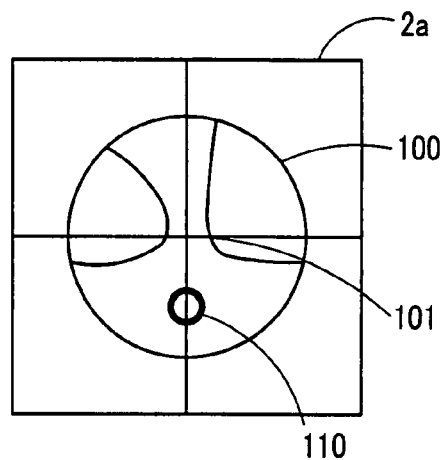
FIG. 4B is a diagram showing the display screen for alignment to bring the measurement region (measurement position) into the far vision portion of the lens LE.
Figure 4C:
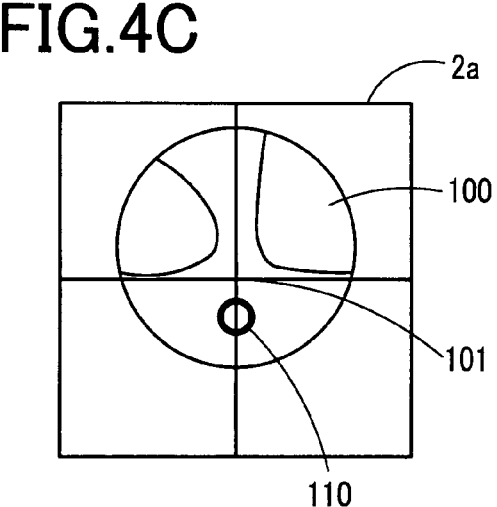
FIG. 4C is a diagram showing the display screen for alignment to bring the measurement region (measurement position) into the far vision portion of the lens LE.

FIG. 4B shows an example of the screen 2a appearing when the measurement region is determined to be in the nearly central part of the lens LE when mounted on the nosepiece 4. When it is determined that the lens LE is mounted on the nosepiece 4, in a step of bringing the measurement region into the far vision portion, an annular guide mark 110 for far vision portion is first displayed within a region corresponding to the far vision portion in the mark 100 to have a correlation with display of the progressive portion. At this time, the arithmetic control part 40 stores distribution information of the spherical equivalent power or the spherical power, and the prism power in the memory 42. In the display state of FIG. 4B, when the lens LE is moved to the back side of the apparatus to cause the mark 110 to approach the mark 101, the mark 100 and mark 110 are moved (respective display positions change) upward on the screen 2a as shown in FIG. 4C relative to the mark 101 fixedly displayed in the center of the screen 2a. As the lens LE is moved, the prism power and the refractive power will vary. Thus, the arithmetic control part 40 calculates a moving distance from an initially stored position based on a Prentice's formula ["displacement distance (mm) from an optical center"="prism power (D (diopter))"/"refractive power (D (diopter))"×10]. Based on the calculated moving distance, the mark 100 and the mark 110 are moved together (respective display positions are changed) as needed.

Figure 4D:
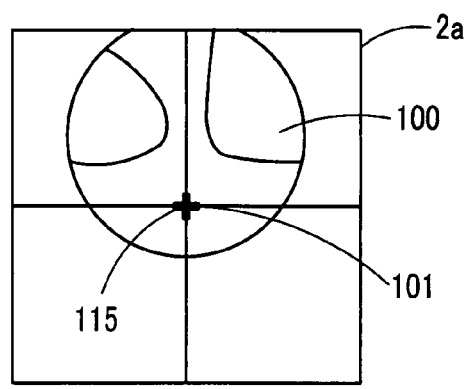
FIG. 4D is a diagram showing the display screen for alignment to bring the measurement region (measurement position) into the far vision portion of the lens LE.

An examiner gradually moves the lens LE so that the mark 110 overlaps with the intersection of the mark 101 in order to align the far vision portion of the lens LE with the optical axis L1. Based on the variation in the obtained spherical equivalent power or the obtained spherical power, the arithmetic control part 40 determines that the measurement region is in the far vision portion when it enters a region with little or no additional power. The arithmetic control part 40 then changes the mark 110 to a bold cross mark 115 and causes this mark 115 to be displayed overlapping with the intersection of the mark 101 as shown in FIG. 4D. This informs of completion of the alignment of the far vision portion. Simultaneously, a measured value on the far vision portion is stored in the memory 42.

Figure 4E:
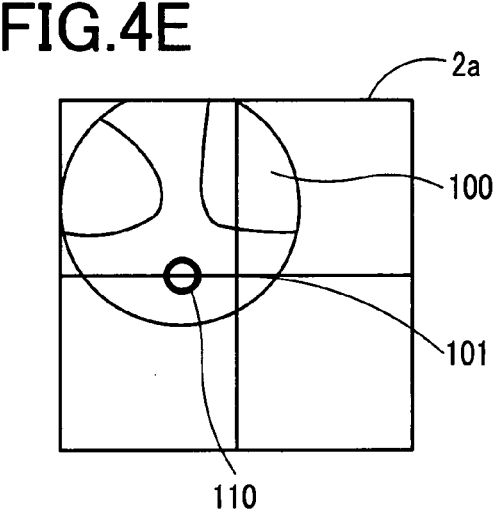
FIG. 4E is a diagram showing the display screen for alignment to bring the measurement region (measurement position) into the far vision portion of the lens LE.

FIG. 4E is a display example of a case where the far vision portion is deviated in the lateral direction relative to the optical axis L1. The displacement in the lateral direction is judged based on a difference (variation) of the horizontal prism power between the measurement positions in the lateral direction of the lens LE. In this case, the lens LE has only to be moved rightward to cause the mark 110 to overlap with the intersection of the mark 101.

On the screen 2a of FIG. 4B, the mark 100 is displayed with the center thereof coinciding with the intersection of the mark 101. Although the arithmetic control part 40 can determine that the progressive portion is being measured based on the difference (variation) of the spherical equivalent power or the spherical power of the lens LE in the vertical direction, it cannot determine a distance to the far vision portion. In the case where the measurement region is in the progressive portion close to the lower edge of the lens LE, accordingly, the mark 100 and the mark 110 may pass over the mark 101 if the mark 100 is moved in a constant relation with the moving amount of the lens LE. Such display may cause confusion for the examiner about a direction to move the lens LE. Thus, the present apparatus is arranged to execute display control that the display moving amount of the mark 100 and the mark 110 is gradually reduced as the measurement region approaches the far vision portion.

In the case where the measurement region is in the progressive portion close to the far vision portion, to the contrary, the mark 110 and the mark 101 on the screen 2a may appear to be apart from each other than an actual distance. However, when it is determined that the measurement region has reached the far vision portion, the mark 100 and the mark 110 are caused to jump and displayed for completion of alignment. Since the display always responds even during movement of the lens LE, the examiner can recognize the measurement region to accurately move the lens LE.

Figure 5A:
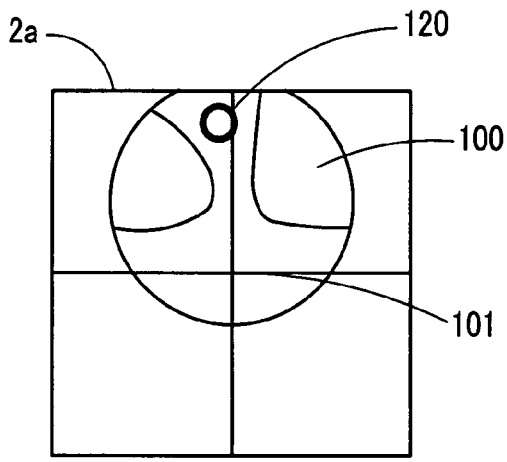
FIG. 5A is a diagram showing a display screen for alignment to bring the measurement region (measurement position) into a near vision portion of the lens LE.

After the measured value in the far vision portion is stored in the memory 42, a step of measuring the near vision portion follows. As shown in FIG. 5A, the mark 115 is caused to disappear and another annular guide mark 120 for near vision portion is displayed within a region corresponding to the near vision portion of the mark 100 to have a correlation with display of the progressive portion. To measure the additional power this time, the lens LE is moved forward of the apparatus to cause the mark 120 to approach the mark 101. At this time, the arithmetic control part 40 calculates a moving distance from the far vision portion based on the prism power and the refractive power in the far vision portion stored in the memory 42. Then, the mark 120 and the mark 100 are displayed while moving toward the mark 101 (respective display positions are changed) based on the calculated moving distance.

Meanwhile, the aforementioned measurement optical system does not detect an actual measurement position on the lens LE and therefore in the above method the relation in display position between the mark 101 and mark 120 merely serves as a guide. Since the position of a target near vision portion (the same applies to the case of the far vision portion) and the optical characteristics of its periphery also differ according to lens powers and manufacturers, the positional correlation can only just be presumed. For instance, even if the mark 120 is displayed as if approaching the mark 101 at one dot per 1 mm in optical displacement of the prism power when the current measurement region is brought close to the near vision portion, the mark 120 will reach the mark 101 in process of movement of the lens LE if the actual moving distance is long, which makes it impossible to indicate a moving direction to the examiner.

Figure 6:
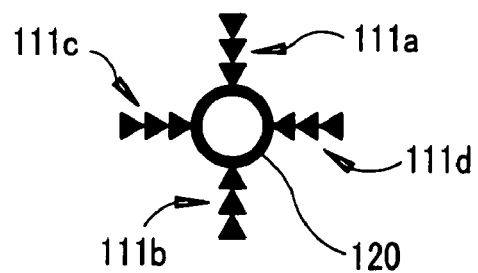
FIG. 6 is an explanatory view showing arrow guide marks.

Thus, arrow guide marks indicating the direction of the lens LE to be moved are displayed as shown in FIG. 6, separately from the positional relationship between the mark 120 and the mark 101. In the present embodiment, arrow guide marks 111a, 111b, 111c, and 111d indicating four directions; downward, upward, rightward, and leftward, are displayed around the mark 120. This makes it possible to continuously issue an instruction for the moving direction to the examiner even when the mark 120 reaches the mark 101 in process of movement of the lens LE.

In the measurement optical system in the present embodiment, the optical characteristics distribution in the measurement region are measured at once. Accordingly, before the measurement region reaches the near vision portion, the degree of approach of the measurement region to the near vision portion (a distance of the measurement region from the near vision portion) according to the movement of the lens LE can also be detected (the same applies to the case of the far vision portion). Utilizing this detection result, the length of each arrow guide mark or the like may be changed stepwise, thereby informing the examiner of the distance from the target position. In the present embodiment, the number of arrows of each mark 111a to 111d is changed in three stages. The number of stages indicated by the number of arrows may be increased more than three.

Figure 7A:
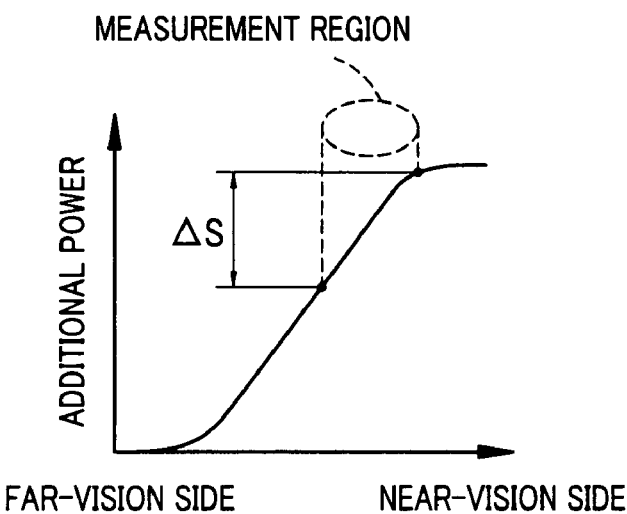
FIG. 7A is a graph to explain a method of detecting a degree of approach (a degree of displacement) of the measurement region (measurement position) with respect to the near vision portion to determine the number of arrows of each arrow guide mark.
Figure 7B:
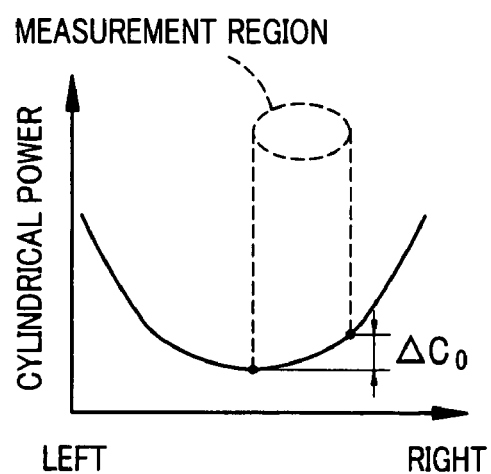
FIG. 7B is a graph to explain the method of detecting the degree of approach (the degree of displacement) of the measurement region (measurement position) with respect to the near vision portion to determine the number of arrows of each arrow guide mark.

As to the marks 111a to 111d, detecting the degree of approach of the measurement region to the near vision portion to determine the number of arrows is explained referring to FIGS. 7A and 7B. The number of arrows of the mark 111a indicating that the lens LE must be moved forward (downward) and the number of arrows of the mark 111b indicating that the lens LE must be moved backward (upward) are determined based on a gradient of the additional power (or the spherical equivalent power) in the optical characteristics distribution in the measurement region. For instance, a gradient (difference) ΔS per unit distance is determined by a difference between the maximum value and the minimum value of the additional power (the spherical power) detected at the measurement positions in the vertical direction centered about the optical axis L1 (see FIG. 7A). A magnitude of this gradient ΔS is compared with three criterion levels S3, S2, and S1 (provided that S3>S2>S1). Each value of S3, S2, and S1 is previously determined in design with reference to various characteristics of a progressive lens. When ΔS>S3, which is regarded as representing that there is still large displacement from the near vision portion, the number of arrows is set to three. When S3>ΔS>S2, which is regarded as representing that the measurement region is approaching the near vision portion, the number of arrows is set to two. When S2>ΔS>S1, which is regarded as representing that it is further approaching the near vision portion, the number of arrows is set to one. When S1>ΔS, if the spherical power is almost equal over the measurement region or if the additional power reaches a peak at the measurement position corresponding to the optical axis L1, it is determined that the measurement region in the vertical direction has reached the near vision portion. Judgment of the direction, upper or lower can be made based on the direction of the gradient ΔS.

In the present embodiment, the actual distance, far or near, from the near vision portion cannot be detected, but an optical distance is detected based on the magnitude of the gradient ΔS. In the progressive lens with small additional power, therefore, there is a case where the gradient ΔS has been small since the measurement position entered the progressive portion. In this case, the moving distance from the far vision portion is calculated based on the prism power; for example, the number of arrows of the mark 111b is set to three or two while the distance from the far vision portion is less than 10 mm, and the number of arrows is then determined based on the gradient $\Delta S$ as the measurement region comes closer to the near vision portion. Reduction in number of arrows of the mark 111b can psychologically (sensuously) show the examiner that the measurement region is approaching the near vision portion. Whether or not the measurement region in the vertical direction has reached the near vision portion is determined based on whether additional power (the spherical power) in the measurement region is not greater than a predetermined level. The additional power (the spherical power) will gradually vary because of the characteristics of the progressive lens. It is therefore possible to at least detect prior to arrival that the measurement region is about to arrive at the near vision portion.

Subsequently, the number of arrows of the mark 111c indicating that the lens LE must be moved rightward and the number of arrows of the mark 111d indicating that the lens LE must be moved leftward are determined based on a difference $\Delta C$ (the amount of optical distortion) between the minimum value of the cylindrical power detected at the measurement position corresponding to the optical axis L1 and the cylindrical power stored during the measurement on the far vision portion. A magnitude of this difference $\Delta C$ is compared with three criterion levels C3, C2, and C1 (provided that C3>C2>C1). Each value of C3, C2, and C1 is previously determined in design with reference to various characteristics of the progressive lens. When $\Delta C \geq C3$, which is regarded as representing that there is still large displacement from the progressive portion, the number of arrows is set to three. When $C3 > \Delta C \geq C2$, which is regarded as representing that the displacement from the progressive portion has been reduced, the number of arrows is set to two. When $C2 > \Delta C \geq C1$, which is regarded as representing that the displacement from the progressive portion has further been reduced the number of arrows is set to one. When $C1 > \Delta C$, it is determined that the measurement region is in almost the center of the progressive portion. Whether the displacement is right or left can be determined depending on whether the minimum value of the cylindrical power detected in the lateral direction is present on the right or left of the optical axis L1. When the measurement region in the vertical direction is determined to be in the near vision portion and the cylindrical power (the amount of optical distortion) at the measurement position corresponding to the optical axis L1 becomes the minimum value, it is determined that the measurement region in the lateral direction is in the near vision portion. Alternatively, $C1 > \Delta C$ and a gradient (difference) $\Delta C0$ per unit distance is determined by a difference between the maximum value and the minimum value of the cylindrical power detected at the measurement positions in the lateral direction centered about the optical axis L1 in the measurement region (see FIG. 7B). When this gradient $\Delta C0$ falls within and remains stable in a predetermined tolerance, it is determined that the measurement region exists in the near vision portion. When the gradient $\Delta C0$ is out of the tolerance, one arrow is displayed in the direction of each of the marks 111c and 111d based on the gradient. This makes it possible to show the examiner whether the measurement region is far from or close to the near vision portion in the vicinity thereof.

Figure 5B:
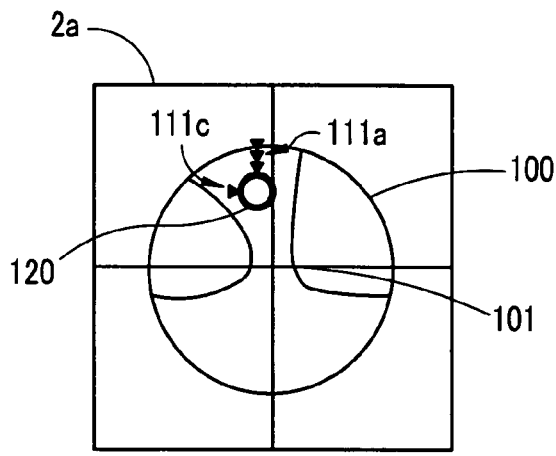
FIG. 5B is a diagram showing the display screen for alignment to bring the measurement region (measurement position) into the near vision portion of the lens LE.
Figure 5C:
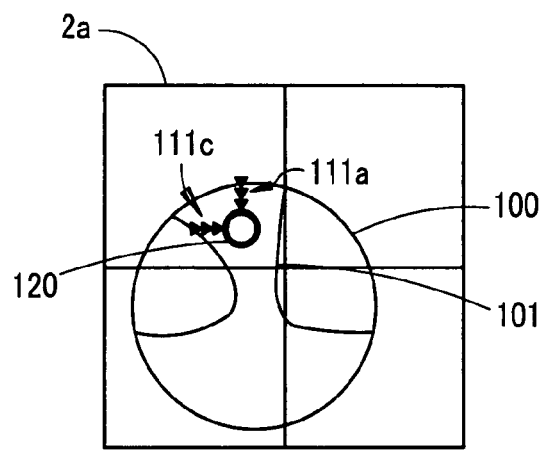
FIG. 5C is a diagram showing the display screen for alignment to bring the measurement region (measurement position) into the near vision portion of the lens LE.
Figure 5D:
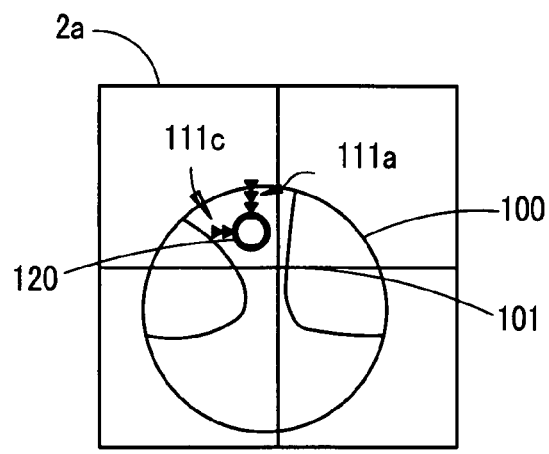
FIG. 5D is a diagram showing the display screen for alignment to bring the measurement region (measurement position) into the near vision portion of the lens LE.

Returning to FIGS. 5B to 5F, operations in a measurement step for the near vision portion will be explained. When the measurement region comes out of the far vision portion and into the progressive portion as the lens LE is moved, as shown in FIG. 5B, the downward mark 111a indicating that the lens LE must be moved forward is displayed at a position above the mark 120. In this case, there is still large displacement from the near vision portion, three arrows are displayed. The number of arrows of the downward mark 111a is reduced according to the degree to which the measurement region has approached the near vision portion. When the measurement region is displaced to the right of the progressive portion, the mark 111c is displayed on the left of the mark 120. When there is large displacement from the progressive portion, the number of arrows of the mark 111c is increased as shown in FIG. 5C. The examiner moves the lens LE to bring the mark 120 toward the mark 101 as shown in FIG. 5D while moving the lens LE by following a guide of each mark 111a to 111d so as to reduce the number of respective arrows.

Figure 5E:
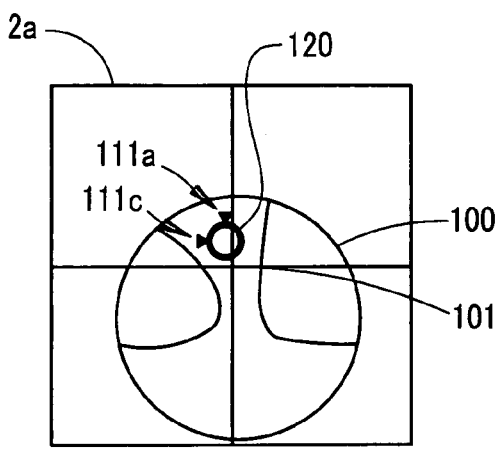
FIG. 5E is a diagram showing the display screen for alignment to bring the measurement region (measurement position) into the near vision portion of the lens LE.

FIG. 5E is an example of a display that the displacement between the measurement region and the near vision portion has been reduced. Since the mark 111a is one in number, it is found that the measurement region is about to reach the near vision portion. The mark 111c is also one in number of arrows and it is therefore apparent that the lens LE has only to be moved slightly rightward.

Figure 5F:
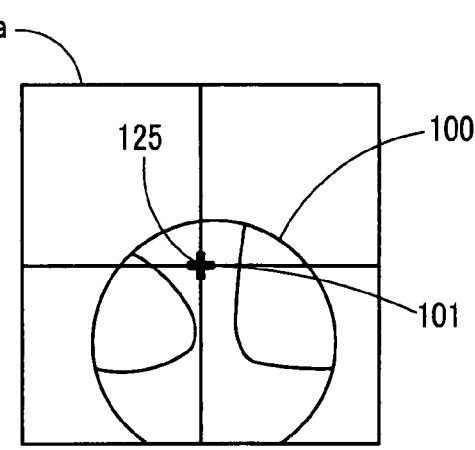
FIG. 5F is a diagram showing the display screen for alignment to bring the measurement region (measurement position) into the near vision portion of the lens LE.

If the additional power (or the spherical equivalent power) detected at each measurement position in the vertical direction centered about the optical axis L and the amount of optical distortion in the lateral direction meet predetermined permissible conditions, it is regarded as representing that the current measurement region is in the near vision portion. When it is determined that the measurement region is in the near vision portion, the mark 120 is changed to a bold cross mark 125 which is displayed overlapping with the intersection of the mark 101 as shown in FIG. 5F. This informs of completion of the alignment of the near vision portion. Simultaneously, a measured value on the near vision portion is stored in the memory 42.

In the present embodiment, when the mark 120 approaches the mark 101 to a certain degree, the display position of the mark 120 relative to the mark 101 is also controlled based on a detection result obtained when the number of the above arrow guide marks is determined. This makes it easy to align the mark 101 and the mark 120 by referring their positional relation as a guide. On the other hand, when the mark 120 (or the mark 101) is intended to move at one dot per 1 mm in optical displacement, for example, there may be a case where the mark 101 reaches the target mark 120. Such a case may cause the examiner to worry about whether the operating direction is proper or to be confused about the desired direction of operation. The configuration of the present apparatus can resolve such disadvantages.

Even in a configuration that does not display the mark 120, the aforementioned marks 111a to 111d have only to be displayed to clarify how far the measurement region has approached the near vision portion as the lens LE is moved by the examiner and also to facilitate fine alignment. In other words, until the measurement region actually reaches the near vision portion, at least one arrow guide mark is displayed in any direction. Thus, the examiner is not confused about the direction in which the lens LE should be moved. From the directions of the arrow guide marks and how the number thereof is reduced, it is possible to recognize whether the direction in which the lens LE must be moved is correct and whether it has approached the near vision portion. The alignment can therefore be readily performed.

In the above embodiment, the marks 111a to 111d are displayed in the measurement step for the near vision portion, but they may be displayed in the measurement step for the far vision portion. Specifically, as to the upper and lower marks 111a and 111b, as is in the case for the near vision portion, the gradient $\Delta S$ is found based on the difference between the maximum value and the minimum value of the additional power (the spherical power) at the measurement positions in the vertical direction centered about the optical axis L1. A magnitude of this gradient ΔS is compared with three criterion levels S3, S2, and S1 (provided that S3>S2>S1) to determine the number of arrows. Each value of S3, S2, and S1 is previously determined in design with reference to various characteristics of the progressive lens and may differ from those of the near vision portion. As to the right and left marks 111c and 111d, the number of arrows may determined based on the magnitude of the horizontal prism power at the measurement positions in the lateral direction.

The measurement optical system is not limited to a configuration capable of measuring at once the optical characteristics at a plurality of measurement positions in the measurement region. Even if an optical system for point-measuring the optical characteristics of a target lens to be measured by a set of measurement light beams (at least three measurement light beams located on the same circle) centered about the measurement optical axis, displaying the above arrow guide marks 111a to 111d can be controlled by obtaining the optical characteristics at plural positions in association with lens movement and continuously comparing results thereof to detect a gradient of additional power. As an apparatus structure in this case, a moving position detecting mechanism, not illustrated, is used to directly detect the amounts of forward/backward and upward/downward movements of the target lens, as set forth in U.S. Pat. No. 5,682,234 (JP-A-9 (1997)-43101). A moving distance associated with the lens movement is determined based on an output from the moving position detecting mechanism. Accordingly, if variations of the lens optical characteristics are continuously determined as well as calculation of the lens moving distance, it is possible to determine a gradient of additional power at a predetermined moving distance. The number of arrows can therefore be determined in the same manner as above.

The invention claimed is:

1. A lens meter for measuring optical characteristics of a target lens to be measured, comprising:
   a measurement optical system including a light source which projects a measurement light beam to the target lens, a target plate having a plurality of targets, and a light receiving sensor which receives the measurement light beam having passed through the target lens and the target plate, the measurement optical system being configured to simultaneously measure a distribution of the optical characteristics at a plurality of measurement positions within a predetermined measurement region of the target lens;
   an arithmetic part which obtains the distribution of the optical characteristics at the measurement positions within the measurement region of the target lens based on a received result by the light receiving sensor;
   mode selecting means which selects between a single focal lens measurement mode and a progressive lens measurement mode;
   detecting means which detects a direction and a degree of displacement of a current measurement position in a vertical direction from a near vision portion of a progressive lens which is the target lens based on additional power, spherical equivalent power, or spherical power in the distribution of the optical characteristics at the measurement positions within the measurement region and detects a direction and a degree of displacement of the current measurement position in a lateral direction from the near vision portion of the progressive lens based on cylindrical power in the distribution of the optical characteristics at the measurement positions within the measurement region, when the progressive lens measurement mode is selected and alignment is made to bring the measurement position into the near vision portion;
   a display which displays an alignment screen; and
   a display control part which causes the display, based on a detection result by the detection means, to display a first guide mark indicating a direction in which and an amount by which the progressive lens must be moved based on the direction and the degree of displacement in the vertical and lateral directions to bring the measurement position into the near vision portion.

2. The lens meter according to claim 1, wherein
the display control part causes a progressive lens mark simulating the progressive lens and a target mark representing the measurement position to be displayed while displaying the first guide mark in a region of the progressive lens mark corresponding to the near vision portion, and the display control part controls a correlation in display position between the target mark and the first guide mark based on the distribution of the optical characteristics at the measurement positions within the measurement region.

3. The lens meter according to claim 1, wherein
the detection means detects a direction and a degree of displacement of the current measurement position in the vertical direction from a far vision portion of the progressive lens which is the target lens based on additional power, spherical equivalent power, or spherical power in the distribution of the optical characteristics at the measurement positions within the measurement region and the detection means detects a direction and a degree of displacement of the current measurement position in the lateral direction from the far vision portion of the progressive lens based on prism power in the distribution of the optical characteristics at the measurement positions within the measurement region, when the progressive lens measurement mode is selected and alignment is made to bring the measurement position into the far vision portion, and
the display control part causes the display, based on the detection result by the detection means, to display a second guide mark indicating a direction in which and an amount by which the progressive lens must be moved based on the direction and the degree of displacement in the vertical and lateral directions to bring the measurement position into the far vision portion.

4. The lens meter according to claim 3, wherein
the display control part causes a progressive lens mark simulating the progressive lens and a target mark representing the measurement position to be displayed while displaying the second guide mark in a region of the progressive lens mark corresponding to the far vision portion, and the display control part controls a correlation in display position between the target mark and the second guide mark based on the distribution of the optical characteristics at the measurement positions within the measurement region.

5. The lens meter according to claim 3, wherein
the display control part causes the second guide mark on the display, the second mark including arrow marks whose directions and the number of which indicate the direction and the amount by which the progressive lens must be moved.

6. The lens meter according to claim 1, wherein
the display control part causes the first guide mark on the display, the first mark including arrow marks whose directions and the number of which indicate the direction and the amount by which the progressive lens must be moved.

7. A lens meter for measuring optical characteristics of a target lens to be measured, comprising:

a measurement optical system including a light source which projects a measurement light beam to the target lens, a target plate having a plurality of targets, and a light receiving sensor which receives the measurement light beam having passed through the target lens and the target plate, the measurement optical system being configured to simultaneously measure a distribution of the optical characteristics at a plurality of measurement positions within a predetermined measurement region of the target lens;

an arithmetic part which obtains the distribution of the optical characteristics at the measurement positions within the measurement region of the target lens based on a received result by the light receiving sensor;

mode selecting means which selects between a single focal lens measurement mode and a progressive lens measurement mode;

detecting means which detects a direction and a degree of displacement of a current measurement position in vertical and lateral directions from a near vision portion of a progressive lens which is the target lens based on the distribution of the optical characteristics at the measurement positions within the measurement region, when the progressive lens measurement mode is selected and alignment is made to bring the measurement position into the near vision portion;

a display which displays an alignment screen; and a display control part which causes the display, based on a detection result by the detection means, to display a guide mark indicating a direction in which and an amount by which the progressive lens must be moved based on the direction and the degree of displacement in the vertical and lateral directions, the display of the amount by which the progressive lens must be moved being changed in predetermined steps in accordance with the degree of displacement, to bring the measurement position into the near vision portion.

8. The lens meter according to claim 7, wherein the detection means detects a direction and a degree of displacement of the current measurement position in the vertical direction from the near vision portion of the progressive lens based on additional power, spherical equivalent power, or spherical power in the distribution of the optical characteristics at the measurement positions within the measurement region and the detection means detects a direction and a degree of displacement of the current measurement position in the lateral direction from the near vision portion of the progressive lens based on cylindrical power in the distribution of the optical characteristics at the measurement positions within the measurement region, when alignment is made to bring the measurement position into the near vision portion.

9. The lens meter according to claim 7, wherein the display control part causes the guide mark on the display, the guide mark including arrow marks whose directions and the number of which indicate the direction and the amount by which the progressive lens must be moved.

* * * * *